United States Patent [19]

Barnum

[11] 4,067,517

[45] Jan. 10, 1978

[54] AUTOMATIC HEADING SYNCHRONIZATION CONTROL SYSTEM

[75] Inventor: Ronald E. Barnum, Trumbull, Conn.

[73] Assignee: United Technologies Corporation, Hartford, Conn.

[21] Appl. No.: 649,331

[22] Filed: Feb. 3, 1976

[51] Int. Cl.² .................. B64C 11/34; G05D 1/08
[52] U.S. Cl. .......................... 244/17.13; 244/175; 244/197; 318/591
[58] Field of Search ............ 244/17.13, 175, 177, 244/179, 184, 189, 196, 197; 235/150.2, 150.25, 150.26, 150.27, 150.22; 318/585, 586, 591; 416/30, 32

[56] References Cited

U.S. PATENT DOCUMENTS

| 3,072,369 | 1/1963 | Alderson | 244/179 X |
| 3,386,689 | 6/1968 | Parker et al. | 244/197 X |
| 3,521,839 | 7/1970 | Diani | 244/197 |
| 4,003,532 | 1/1977 | Adams, Sr. et al. | 244/196 X |

Primary Examiner—Stephen G. Kunin

[57] ABSTRACT

The automatic heading retention mode of operation of a flight control system for a rotary wing aircraft is discontinued and reestablished through the use of logic circuitry responsive to the bank angle of the aircraft and to the force applied to a control stick by the pilot. When the bank angle of the aircraft exceeds a preselected minimum and the lateral force applied to the cyclic pitch stick also exceeds a predetermined minimum the logic circuit operates to isolate the heading hold control from heading error signals and the heading retention mode of operation is automatically resumed when both of the bank angle and stick force fall below the preselected minimum levels. The invention may also encompass the application to the control mechanism of signals which will cause the aircraft to perform coordinated turns above a preselected minimum airspeed.

14 Claims, 1 Drawing Figure

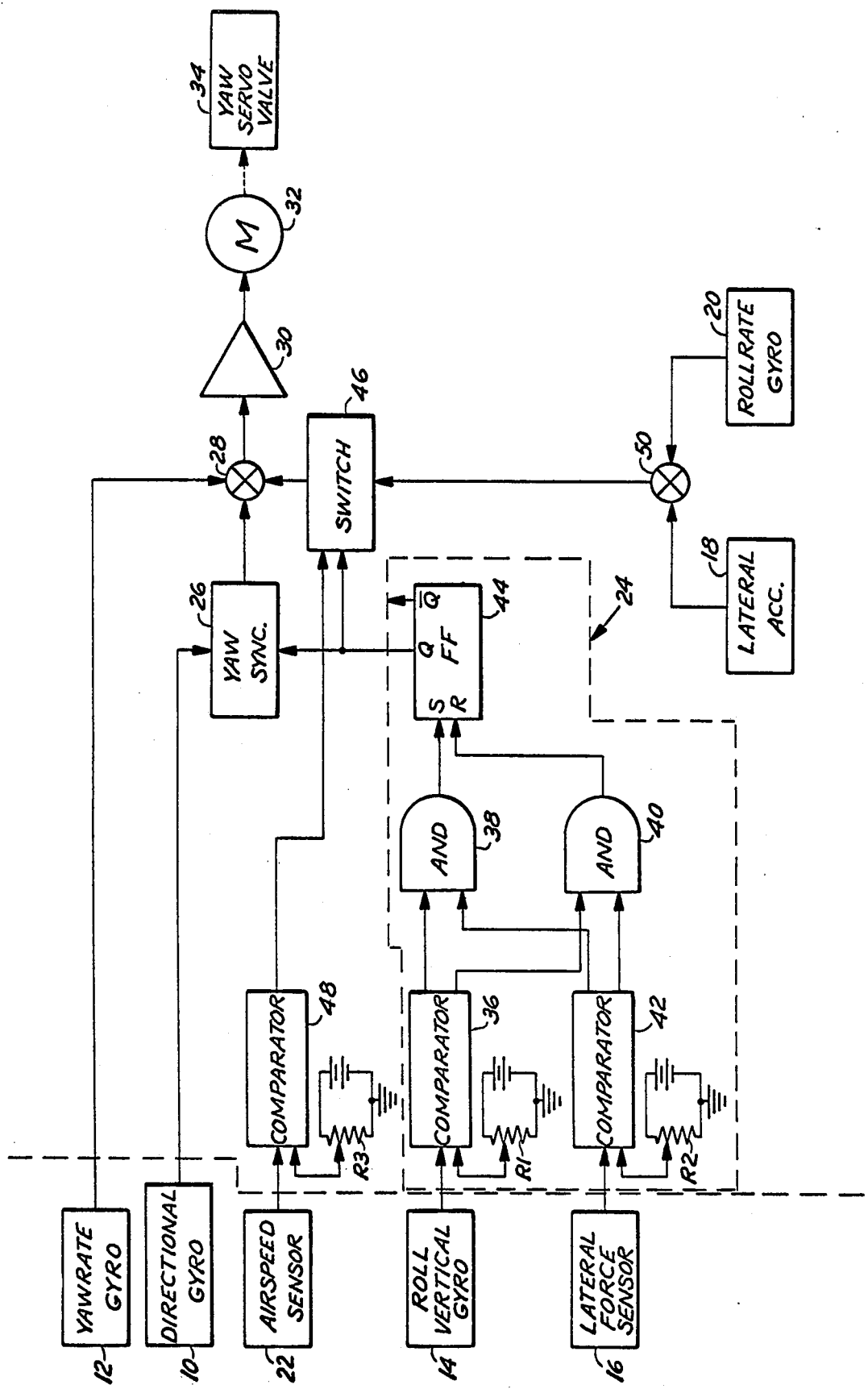

AUTOMATIC HEADING SYNCHRONIZATION CONTROL SYSTEM

The invention herein described was made in the course of or under a contract or sub-contract thereunder with the Department of the Army.

BACKGROUND OF THE INVENTION

1. Field of the Invention

The present invention relates to facilitating the exercise of control over aircraft and particularly rotary wing aircraft. More specifically, this invention is directed to means for automatically controlling the engagement and disengagement of the heading hold mode of an automatic flight control system. Accordingly, the general objects of the present invention are to provide novel and improved methods and apparatus of such character.

2. Description of the Prior Art

While not limited thereto in its utility, the present invention is particularly well suited for incorporation in an automatic flight control system for helicopters. When flying a helicopter a pilot must manipulate three separate control elements; i.e., the collective pitch stick, the cyclic pitch stick and the yaw pedals. Since a helicopter is an inherently unstable aircraft, manual flight control requires constant manipulation of these controls to maintain a predetermined attitude. Accordingly, to facilitate their use, automatic flight control systems for rotary wing aircraft have been devised. An early version of such an automatic flight control system is shown and described in U.S. Pat. No. 2,845,623.

Automatic flight control systems for helicopters include, in a yaw "channel", means for implementing a heading hold mode of operation. When in the heading hold mode the aircraft will fly "hands off" along a linear course selected by the pilot. A heading hold mode of operation, and the apparatus which permits such operation, are well known in the art and will be briefly discussed below in the description of the preferred embodiment of the present invention.

When the aircraft is in an automatic control mode, for example a heading hold mode, any deviations from the desired attitude will be sensed and appropriate corrective action automatically taken. In order to insure rapid and accurate aircraft response to a pilot input when the automatic flight control system is engaged, for example when an evasive maneuver is suddenly required, it is necessary that provision be made for disengagement of the automatic control or selected functional modes thereof. Such disengagement must be accomplished both automatically and quickly in order to insure that, when manual control is resumed, the automatic flight control system will not be resisting the input commands generated by the pilot. To this end, considering the heading hold mode of a helicopter automatic flight control system, sensor switches have customarily been provided on the yaw pedals. In order to assume manual control and disengage the heading hold mode, it was necessary for the pilot to place his feet on the yaw pedals thus actuating the pedal switches and thereby generating disengagement control signals. The employment of yaw pedal switches, however, required that the pilot have his feet on the pedals to make a turn and precluded the positioning of the pilot's feet on the yaw pedals during the heading hold mode. The necessity for the pilot to reposition his feet in order to shift between the manual and automatic control modes resulted, among other disadvantages, in a time delay incident to the resumption of manual control.

As a further requirement of an automatic flight control system for rotary wing aircraft, it is necessary that the circuitry which supervises the automatic engagement and disengagement of the heading hold mode be capable of distinguishing between a pilot input and a sudden comparatively large magnitude attitude change such as might be incident to a wind gust. Thus, the aforementioned disadvantages incident to the employment of yaw pedal mounted sensor switches can not be overcome merely by sensing the magnitude of an attitude change, such as a bank, since such attitude magnitude change sensing would be unable to discriminate between transient conditions, for which it is desired to compensate utilizing the heading hold logic, and those conditions where the pilot wishes to disengage the heading hold logic so as to execute a maneuver.

As a further complicating factor, aircraft, and particularly rotary wing aircraft, have a threshold speed of operation above which maneuvers such as turns should preferably be coordinated. As employed herein the term "coordinated turn" is synonymous with a bank turn, as opposed to a flat turn, and is a turn wherein the aircraft does not exhibit any lateral acceleration as characterizes a slip or skid. Thus, the yaw channel of the heading hold logic of an automatic flight control system should, above a preselected air speed, be capable of commanding and controlling automatic coordinated turns when in the manual mode; i.e., with the heading hold disengaged. In such a coordinated turn the yaw control will be automatically repositioned to produce the proper turn for the bank angle established by the pilot through manipulation of the cyclic pitch stick. Thus, should the pilot institute a maneuver, the heading hold mode should be automatically disengaged but sufficient control retained so as to produce a coordinated turn if the air speed is above a preselected level. Below this preselected air speed the disengagement of the heading hold mode should result in the pilot having total manual control.

SUMMARY OF THE INVENTION

The present invention overcomes the above-described disadvantages of the prior art by providing a novel and improved technique for engaging and disengaging the automatic heading hold mode of operation of an aircraft flight control system and by providing apparatus for use in the practice of that novel technique. In accordance with this invention the heading hold mode of operation is automatically discontinued, and heading error signals isolated from the actuator portion of a flight control system, when a preselected bank angle is exceeded and a lateral force in excess of a predetermined minimum is applied to a pilot operated control lever which, in the case of a helicopter, will be the cyclic pitch stick. Upon discontinuance of the heading hold mode the aircraft will, except during pilot commanded turns above a preselected airspeed, be under manual control. The manual control mode will be continued until both the bank angle and stick force fall below their preset minimum values.

Also in accordance with the invention, turns executed by the pilot at speeds in excess of a preselected minimum will be coordinated by automatically generating and delivering signals to the flight control system actuator which oppose any tendency of the aircraft to slip or skid. These signals are generated by a lateral accelerometer and a gyroscope sensitive to aircraft roll. A switching circuit permits delivery of these sensor generated signals to the actuator only when the control is in the manual mode and the airspeed exceeds the selected minimum value.

BRIEF DESCRIPTION OF THE DRAWING

The present invention may be better understood and its numerous objects and advantages will become apparent to those skilled in the art by reference to the accompanying drawing which is a functional block diagram of a yaw channel of an automatic flight control system incorporating the present invention. DESCRIPTION OF THE PREFERRED EMBODIMENT With reference now to the drawing, a yaw channel for an automatic flight control system is depicted in functional block diagram form. The yaw channel provides, as will be described in detail below, automatic heading retention and rate damping. The yaw channel shown in the drawing also causes the aircraft to automatically perform coordinated turns in response to heading change commands initiated above a preselected air speed.

The inputs to the flight control system yaw channel of the present invention include a directional gyro 10 which may be of the magnetically slaved type. The directional gyro or compass 10 senses aircraft heading and, subsequent to selection of a desired heading, provides an output signal commensurate with heading error.

A yaw rate gyro 12 generates a second input signal for application to the yaw channel of the present invention. The yaw rate gyro 12 senses the rate of heading change and develops a signal commensurate with the direction and rate of aircraft yaw. In the manner to be described below, and as is conventional in the art, the rate signal provided by yaw gyro 12 is phased such that it opposes any heading change thereby damping the response of the aircraft to heading error influences.

Additional inputs to the yaw channel depicted in the drawing are derived from a roll vertical gyro 14, a lateral stick force sensor 16, a lateral accelerometer 18, a roll rate gyro 20 and an air speed sensor 22. The outputs of the lateral accelerometer, roll rate gyro and air speed sensor are utilized during coordinated turns. The roll vertical gyro and lateral stick force sensor generate input signals which are applied to a heading synchronization logic circuit, indicated generally at 24, to automatically control engagement and disengagement of the heading hold mode of operation.

During heading retention; i.e., in the automatic heading hold mode; heading error signals provided by the directional gyro 10 are coupled, via a control transformer in a yaw synchronizer 26, to a summing circuit 28. As will become obvious from the discussion below, the yaw synchronizer functions to null heading error signals when a new heading is desired. The yaw synchronizer, which includes a control transformer and a motor for positioning the transformer rotor, is part of previously available automatic flight control systems and does not comprise part of the present invention. The output of the control transformer in the yaw synchronizer 26 will be zero at the time of engagement of the heading hold operational mode. In the heading hold mode, deviations from the selected flight path, as indicated by a change in the output of directional gyro 10, will result in a heading error signal appearing at the output of the yaw synchronizer 26. The output of synchronizer 26 will, in the heading hold mode, be proportional to the difference between the actual heading and the desired heading; the desired heading being the heading at which synchronizing ceased. Heading error signals from synchronizer 26 are coupled, via summing circuit 28, to an amplifier 30. The output of amplifier 30 is delivered as the input to a servo drive motor 32. The servo driver 32 commands the rotation of the yaw channel servo valve 34 thereby resulting in a displacement of a power piston and the flight controls connected thereto. The aircraft will, accordingly, be turned in the proper direction until the output of directional gyro 10 restores the yaw synchronizer control transformer output to null.

As noted above, the yaw rate gyro 12 provides rate damping about the yaw axis. To accomplish such damping, the output of yaw rate gyro 12 is also applied to summing circuit 28 in such a manner as to oppose any heading change command signals appearing at the output of the yaw synchronizer 26.

It will be understood by those skilled in the art that the yaw channel, as described above, is in accordance with the prior art. It will also be understood that the heading hold mode is energized by the pilot in switching the automatic flight control system to the "on" condition. In accordance with the present invention, additional inputs to the yaw channel are provided by the roll vertical gyro 14 and the stick force sensor 16. The output of the roll vertical gyro is applied to a comparator 36 in the heading synchronization logic circuit 24 wherein it is compared with a bias signal commensurate with a preselected roll attitude as established by the setting of a potentiometer R1. This preselected roll attitude may, for example, be a bank angle of approximately 2°. Comparator 36 has a pair of outputs which will, respectively, be at a high level depending on whether the signal corresponding to the actual bank angle is greater or less than the bias signal. Comparator 36 may, for example, comprise an operational amplifier, which receives the bias and sensor generated input signals, and a monostable multivibrator. Typically the output of the amplifier will be maintained at zero potential until the input from gyro 14 exceeds the bias from potentiometer R1 at which time the amplifier output will go positive and the multivibrator will be set. The first output of comparator 36, which will be in a "high" state when the output of the roll vertical gyro 14 indicates that the preselected bank angle has been exceeded, is applied as a first input to AND gate 38. The other output of comparator 36, which will be in the "high" state when the bank angle commensurate with the setting of potentiometer R1 is greater than the actual bank angle, will be applied as a first input to an AND gate 40.

The output of lateral stick force sensor 16 is applied as a first input to a second comparator 42. Comparator 42 may be identical to comparator 36. The sensor 16 will comprise a standard force measuring device coupled to the cyclic pitch stick. The output of stick force sensor 16 will be compared, in comparator 14, with a bias voltage commensurate with a preselected minimum force; the minimum force bias voltage being developed at the wiper arm of a second potentiometer R2. When the output of force sensor 16 exceeds the preset bias, indicative of the pilot having moved the cyclic pitch stick incident to commanding a turn, a first output of comparator 42 will go "high". This first output of comparator 42 is applied as a second input to AND gate 38.

The second output of comparator 42 will go "high" when the output of force sensor 16 is less than the preselected bias; this condition indicating that any force applied to the cyclic pitch stick has resulted from outside influences for which the automatic flight control system must compensate. This second output of comparator 42 is applied as the second input to AND gate 40.

The outputs of AND gates 38 and 40 are respectively delivered as the "set" and "reset" inputs to a bistable multivibrator circuit 44. The multivibrator or flip-flop 44 will thus be set when the actual bank angle exceeds the preselected minimum and the force applied to the cyclic pitch stick also exceeds a preselected minimum. Conversely, flip-flop 44 will be reset when the bank angle returns to a magnitude less than the preselected minimum and the force applied to cyclic pitch stick is less than the preselected minimum. The flip-flop 44 provides, at its output terminal when in the set condition, a control signal which is delivered to yaw synchronization circuit 26 and to an air speed switch 46.

The control signal from flip-flop 44, when applied to the yaw synchronization circuit 26, will turn the heading hold of the automatic flight control system to the "synchronized" condition. With circuit 26 in the "synchronized" state, the output of directional gyro 10, as sensed at the secondary of the control transformer in synchronization circuit 26, will be amplified and employed to drive the motor in circuit 26. This motor will reposition the rotor of the control transformer so as to null the control transformer output. Accordingly, at the time the synchronizing signal from flip-flop 44 is removed from yaw synchronization circuit 26, the control transformer output will be nulled and a new heading will have been selected. Similarly, during the synchronized condition, because of this nulling action, no error signal will be delivered to summing circuit 28 from directional gyro 10. During the manual control mode; i.e., with circuit 26 in the "synchronized" state; the output of yaw rate gyro 12 will continue to be applied to the servo amplifier 30 via summing circuit 28 and, as the aircraft turns, the yaw rate signal will provide rate damping.

The yaw channel of an automatic flight control system in accordance with the present invention also causes the aircraft to automatically perform, when in the manual mode and above a preselected speed, coordinated turns; i.e., turns wherein the aircraft does not exhibit any lateral acceleration. An input signal from airspeed sensor 22, having a magnitude proportional to the forward speed of the aircraft, is applied to a further comparator 48 wherein it is compared with a bias signal derived from potentiometer R3. The bias signal will, in a typical example, be selected to correspond to 60 knots. Comparator 48 will provide an output control signal, which is delivered as a second input to air speed switch 46, whenever the speed of the aircraft is above 60 knots. When both input signals are present; i.e., when the air speed is above the preselected level and the output of heading synchronization logic circuit 24 is indicative of the manual operational mode, circuit 46 will be switched from its normally open state to the closed state. This permits the signals from the lateral accelerometer 18 and roll gyro 20 to be applied, via summing circuit 28, to the input of amplifier 30.

Continuing with a discussion of the automatic coordinated turn mode, the roll rate gyro produces an output signal proportional to the aircraft roll rate; i.e., the gyro 20 provides a signal which is employed to anticipate the turn and aid in establishing the proper tail rotor pitch when commencing the turn. Thus, the output signal from gyro 20 will be phased, in the manner known in the art, such that it will aid in repositioning the yaw servo valve 34 to initiate the proper turn for the bank angle established by the pilot through movement of the cyclic pitch stick. When the aircraft stops rolling the roll rate gyro output decays to zero and the output of the lateral accelerometer 18 will coordinate the turn rate to the bank angle. The lateral accelerometer 18 senses lateral acceleration during a turn, indicative of the aircraft slipping into the turn or skidding out of the turn, and provides an output signal having a magnitude proportional to the "error" and a phase commensurate with the direction of the "error". This acceleration "error" signal, via the yaw servo system, drives the tail rotor pitch to correct the "error". Accordingly, should the aircraft slip or skid during a turn executed at an air speed in excess of 60 knots the resulting output developed by the lateral accelerometer 18 will cause repositioning of the yaw servo 34 to reestablish the coordinated turn. The outputs of lateral accelerometer 18 and roll gyro 20 are summed in a summing circuit 50 prior to being passed to summing circuit 28 via switching circuit 46.

To briefly summarize, at a speed above a preselected level, for example 60 knots, should the pilot desire to turn the aircraft to a new heading he will manipulate his controls whereby the output signals from cyclic lateral stick force sensor 16 and roll vertical gyro 14 will exceed the preselected bias levels thus causing the heading hold to be disengaged and switch 46 to be closed. Upon closing of switch 46, turning of the aircraft will be coordinated; i.e., the turn rate will be coordinated to the pilot selected bank angle by application of the outputs from either or both of lateral accelerometer 18 and roll gyro 20 to the input of servo amplifier 30. At this time, due to disengagement of the heading hold, heading error signals are nulled and thus there will be no heading error input to summing circuit 28.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for exercising control over the flight of a rotary wing aircraft, the aircraft having a flight control system with the capability of automatically holding the aircraft on a desired heading, said method including the steps of:
   discontinuing the automatic heading hold mode of operation when a bank angle in excess of a predetermined minimum is experienced and an operator applies a force in excess of a predetermined minimum to the aircraft cyclic pitch control stick;
   exercising manual control over the flight of the aircraft upon discontinuance of the heading hold mode of operation; and
   resuming the automatic heading hold mode of operation when the bank angle falls below the predetermined minimum and the force applied to the cyclic pitch stick also falls below the predetermined minimum force.

2. The method of claim 1 wherein the step of exercising manual control includes:

exercising complete manual control when the airspeed of the aircraft is below a preselected minimum; and supplementing the manual control by delivering commands to the aircraft flight control system which compensates for lateral accelerations experienced when the aircraft executes a turn at a speed in excess of the predetermined minimum speed.

3. The method of claim 1 wherein the step of discontinuing the automatic heading hold mode of operation comprises:

sensing the bank angle of the aircraft;

comparing the sensed bank angle with a preselected bank angle and generating a first control signal when the sensed bank angle exceeds the preselected angle;

sensing the lateral force applied to the cyclic pitch stick;

comparing the sensed force with a preselected force and generating a second control signal when the sensed force exceeds the preselected force;

nulling out directional error signals which would be delivered to the flight control system in the automatic heading hold mode when both of said first and second control signals are present.

4. The method of claim 3 wherein the step of resuming the automatic heading hold mode of operation comprises:

detecting the termination of generation of both of said first and second control signals and generating a third control signal when said first and second control signals are removed; and terminating the nulling of directional error signals upon generation of the third control signal whereby the application of directional error signals to the aircraft flight control system will be resumed.

5. The method of claim 4 wherein the step of exercising manual control includes:

exercising complete manual control when the airspeed of the aircraft is below a preselected minimum; and supplementing the manual control by delivering commands to the aircraft flight control system which compensate for lateral accelerations experienced when the aircraft executes a turn at a speed in excess of the predetermined minimum speed.

6. The method of claim 5 further comprising the step of:

sensing changes in aircraft yaw rate and generating signals commensurate therewith; and applying the thus generated yaw rate signals to the aircraft flight control system in opposition to direction error and lateral acceleration compensation signals whereby corrections in aircraft heading and attitude are damped.

7. In a flight control system for a rotary wing aircraft, the flight control system having a yaw channel with the capability of automatically holding the aircraft on a desired heading, the yaw channel receiving signals commensurate with deviations from a desired heading and applying heading correction commands to an actuator coupled to a device for varying the heading of the aircraft, the improvement comprising:

means for sensing the actual bank angle of the aircraft and generating a signal commensurate therewith;

means for generating a bias signal commensurate with a preselected minimum bank angle;

first comparator means for comparing said signals commensurate with actual bank angle and preselected minimum bank angle and providing a first output signal when the actual bank angle exceeds the predetermined minimum bank angle;

means coupled to a pilot's bank angle selection control mechanism for sensing the force applied thereto and generating a signal commensurate therewith;

means for generating a bias signal commensurate with a predetermined minimum control mechanism applied force;

second comparator means for comparing said actual and preselected minimum control mechanism applied forces and providing a first output signal when the actual force exceeds the preselected minimum force; and means responsive to the generation of first output signals by both of said first and second comparator means for isolating the yaw channel actuator from heading correction commands when said bank angle exceeds the predetermined minimum and the force applied to the control mechanism exceeds the predetermined minimum.

8. The apparatus of claim 7 wherein each of said first and second comparator means provides a second output signal when the magnitude of the input bias signal exceeds the magnitude of the sensed parameter input signal and wherein said apparatus further comprises:

means responsive to the presence of said second output signals from said first and second comparator means for resuming the application of heading correction commands to the yaw channel actuator.

9. The apparatus of claim 7 wherein said means for isolating the yaw channel actuator from heading correction commands includes:

synchronization signal generating means, said synchronization signal generating means providing an output signal which assumes two states, said synchronization signal generating means output signal assuming a first state in response to the generation of said first control signals by said first and second comparator means; and means responsive to the state of the output of said synchronization signal generating means for nulling heading correction commands when said synchronization signal generating means output is in the first state.

10. The apparatus of claim 9 wherein said first and second comparator means each provide a second output signal when the magnitude of the input bias signal exceeds the magnitude of the sensed parameter input signal and wherein said apparatus further comprises:

means responsive to the generation of said second output signals by both of said first and second comparator means for causing said synchronization signal generating means to assume its second output state.

11. The apparatus of claim 10 further comprising:

means for sensing the speed of the aircraft and generating a signal commensurate therewith;

means for generating a bias signal commensurate with a preselected minimum airspeed;

third comparator means responsive to the signals commensurate with airspeed and preselected minimum airspeed for providing an output signal when the actual airspeed exceeds the preselected minimum airspeed;

means for sensing any lateral acceleration of the aircraft and generating signals inversely related thereto; and switch means responsive to the output signal from said third comparator means and to the first state of the output signal provided by said synchronization signal generating means for delivering said signals inversely related to sensed lateral accelerations to the yaw channel actuator when the actual airspeed exceeds the predetermined minimum and the heading correction commands have been isolated from the actuator whereby said acceleration related signals will cause a corrective action in opposition to sensed lateral accelerations.

12. The apparatus of claim 11 wherein said means for generating signals related to lateral accelerations include:

a lateral accelerometer;

a roll rate gyro;

means for summing output signals provided by said lateral accelerometer and roll rate gyro.

13. The apparatus of claim 12 further comprising:

means for sensing the rate of change of the yaw attitude of the aircraft and providing a signal commensurate therewith; and means for delivering said yaw rate signals to the yaw channel actuator to damp heading correction commands.

14. The apparatus of claim 10 further comprising:

means for sensing the rate of change of the yaw attitude of the aircraft and providing a signal commensurate therewith; and means for delivering said yaw rate signals to the yaw channel actuator to damp heading correction commands.

* * * * *